Aug. 20, 1946.  E. C. ANDERSON  2,406,279
BELT CONVEYER
Filed May 28, 1945  2 Sheets-Sheet 1

INVENTOR.
Edmund C. Anderson
BY
Harvey M. Gillespie
Atty.

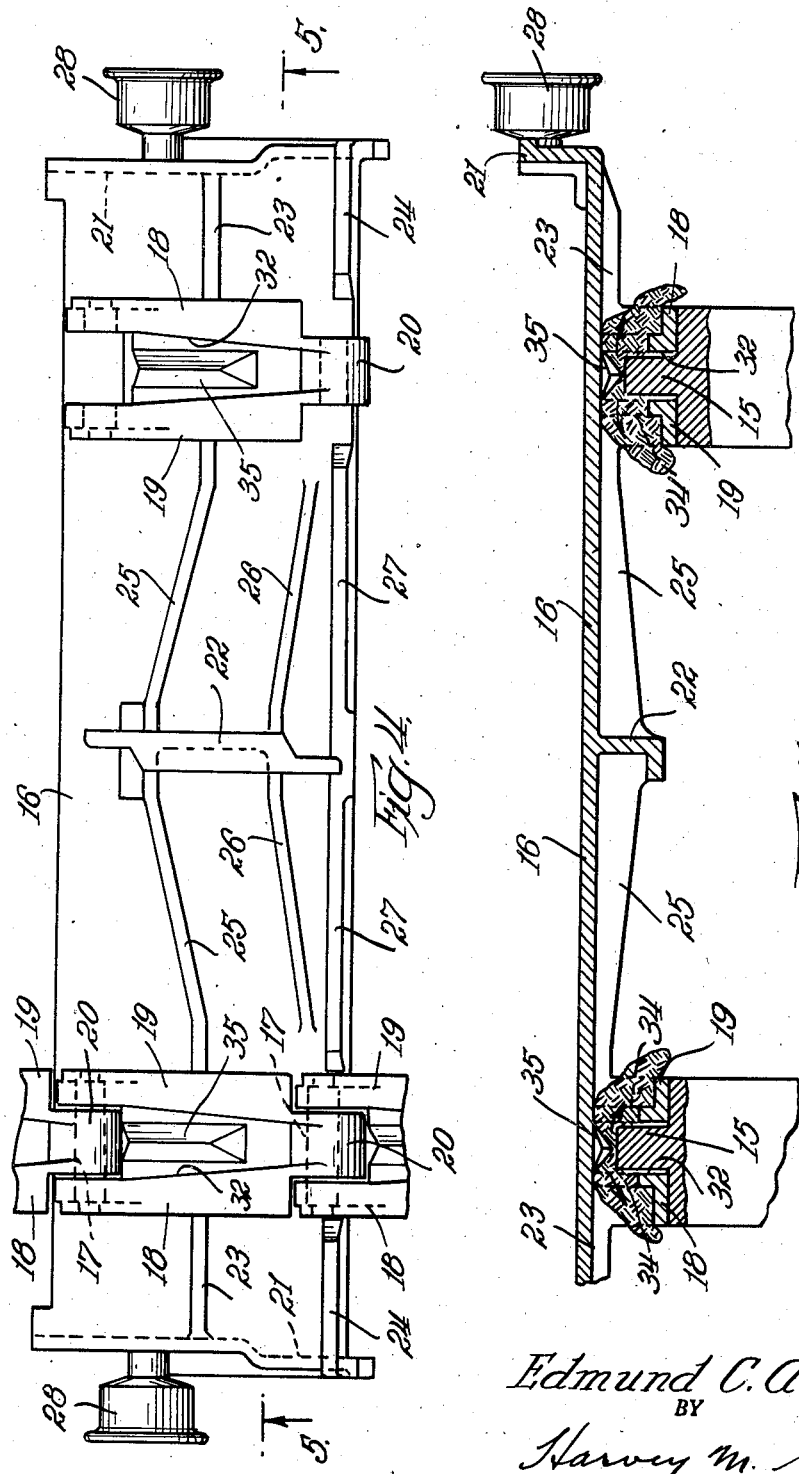

Patented Aug. 20, 1946

2,406,279

UNITED STATES PATENT OFFICE 2,406,279

BELT CONVEYER

Edmund C. Anderson, Homewood, Ill., assignor to Kensington Steel Company, Chicago, Ill., a corporation of Illinois Application May 28, 1945, Serial No. 596,230

8 Claims. (Cl. 198—230)

This invention relates to certain new and useful improvements in link belt conveyers, and more particularly to conveyers of this type in which the belt is composed of a series of plate elements fixed to one or more chain link elements per se to form one pivotally connected unit of the conveyer.

In the type of conveyer to which this invention appertains, the plate elements of the conveyer are overlapped so as to provide a continuous belt. Also the chain link elements per se ordinarily consist of spaced side bars formed integrally with the bottom surface of their associated plate element and the recess formed thereby for receiving the tooth of a driving sprocket is closed on all sides except where the sprocket tooth enters the recess.

Considerable difficulty has been experienced heretofore by reason of the fact that quantities of material find lodgment in the said closed recesses formed by the plate and chain link side bars. The material may be the bulk material being handled by the conveyer or it may be from other sources, for example, rain or snow. If there is an accumulation of such materials retained and gradually built up in the recesses at the inner faces of the plate of the links, such materials are compressed more or less in the recesses by the action of the teeth of the sprockets. As such masses of foreign matter build up in the recesses, they become more and more likely to interfere with the easy operation of the conveyer.

In the use of conveyers of this type out of doors during the winter season, the trouble is particularly bad, in that an accumulation of ice or snow may be built up in the recesses and, therefore, must be cleaned out manually before the conveyer can be used.

It is the object of the present invention to provide an improved construction and arrangement by reason of which the operation of the conveyer serves to force out the accumulated material so as to put the conveyer in condition for effective operation. To this end, a construction has been provided by which pressure is applied effectively on any substantial masses of foreign material in the recesses on the inner faces of the links so as to break up such masses. In this connection the invention includes the provision of a cutting element positioned to cooperate with the teeth of a sprocket to break up the hard material, openings being provided preferably in the side walls of the recesses in close proximity to the points where the pressure is applied to the material so as to force the broken up material laterally out of position in the recesses.

Another object of the invention is to provide improved constructions whereby accumulations of soft material, for example, clay, will be extruded from the recesses of the link elements before it becomes dry and hard.

Another object of the invention is to improve devices of this type in sundry details hereinafter pointed out. The preferred means by which the several objects have been attained are illustrated in the accompanying drawings, in which Fig. 1 is a side face view of one end portion of a link belt conveyer embodying the improved construction, with some of the parts broken away for clearness of illustration.

Fig. 4 is an inside face view of one of the plate links on a very substantially enlarged scale, with portions of the adjacent lengths also shown; and Fig. 5 is a vertical sectional view taken substantially at the line 5—5 of Fig. 4.

Figure 1:
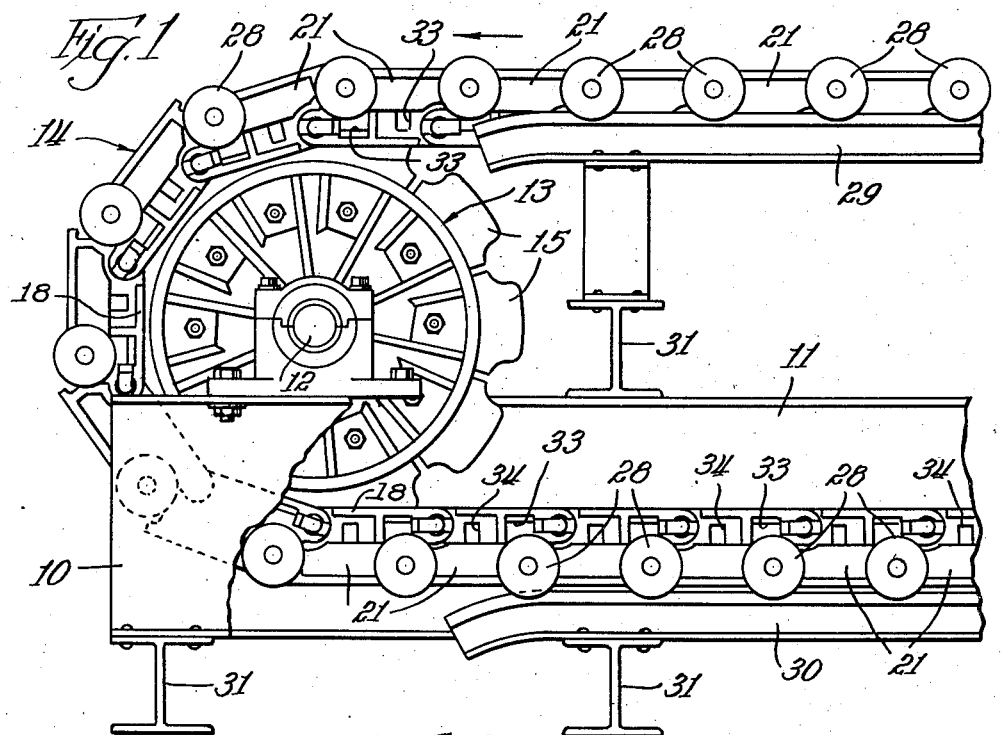

Referring now to the several figures of the drawings, in which corresponding parts are indicated by the same reference characters, 10 and 11 indicate heavy I-beams at opposite sides of the conveyer structure, serving rotatably to support a shaft 12 having large sprocket wheels 13 mounted thereon so as to support and drive an endless conveyer belt 14. The sprockets 13 are of any approved type with their teeth 15 comparatively long circumferentially of the sprockets.

In the preferred arrangement as shown the conveyer is formed of a series of links 16 in the form of plates connected together in a series by means of pins or bolts 17. As is clearly shown in Fig. 4, each of the link plates 16 is provided on its inner face with two chain links per se comprising side bars 18 and 19, such side bars being in spaced relation to each other and being connected together at one edge of the plate 16 by a sleeve portion 20 adapted to receive one of the pins or bolts 17. The sleeve 20 is of a length to have a working fit between the ends of the plates 18 and 19 of the next adjacent link, fragmentary portions of two adjacent links being shown at the left in said Fig. 4 for showing the relationship of the parts. The arrangement is such that two pins 17 at opposite ends of the link plate serve to connect the adjacent link plate pivotally thereto, and that the sleeves 20 serve as bearings for engagement by the teeth of the sprockets 13 for driving the conveyer. Preferably, the adjacent edge portions of the several link plates are curved for enabling the adjacent plates to form an effective seal for preventing the material being carried on the conveyer from leaking between the plates.

Each of the said plates 16 is provided on its outer face with two flanges 21 which extend outwardly a substantial distance for holding in position on the plate the material being handled by the conveyer. One end portion of each of the flanges 21 is preferably offset transversely with respect to the remaining portion of the flange so that the flanges of adjacent link plates are adapted to overlap each other so as to prevent the loss of material being handled.

The inner face of each of the link plates is provided at its central portion with a cross flange 22 formed integrally therewith for strengthening the link. Other strengthening ribs are provided extending longitudinally of the link, including ribs 23 and 24 at each end portion of the link, and ribs 25, 26 and 27 at opposite faces of the cross flange 22.

Means is provided for supporting the top and bottom runs of the conveyer independently of the sprockets. This means comprises rollers 28 rotatably mounted on the end faces of the link plates in position to engage supporting rails or bars 29 and 30 suitably supported by means comprising transversely positioned I-beams 31 as shown in Fig. 1.

Figure 2:
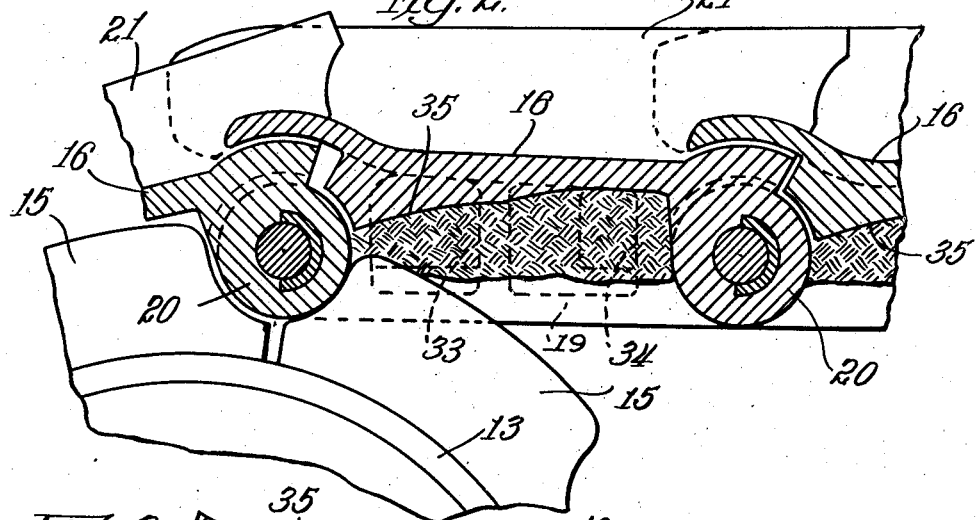
Fig. 2 is a side face view of one of the plate links and portions of the links connected thereto in position at the sprocket, being shown on a considerably enlarged scale, with some of the parts in section.
Figure 3:
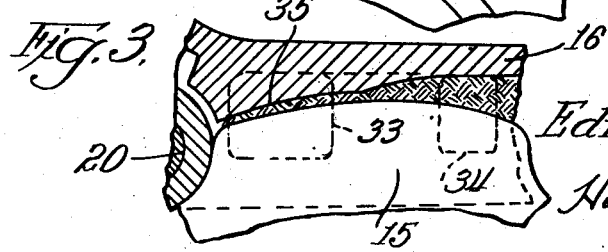
Fig. 3 is a fragmentary view similar to a portion of Fig. 2 but showing a changed position of the parts with respect to each other.

As is indicated by the dotted line showing of one of the teeth 15 of one of the sprocket wheels (see Fig. 5), the link side bars 18 and 19 are in proper position on the inner faces of the link plates 16 for receiving the teeth of the sprocket wheels therebetween, said side bars serving to hold the conveyer in normal operative position transversely with respect to the sprocket wheels 13. One of the side bars 19 of one of the link plates 16 is shown in Fig. 2 with the bearing sleeves 20 of two adjacent plates 16 at opposite edges of the intermediate plate 16 as shown. The plates 18 and 19 and the bearing sleeves 20 extending therebetween form recesses 32 on the inner faces of the link plates in position to receive the teeth 15 of the sprocket wheels. The said recesses 32 on the plates 16 in the bottom run of the conveyer are of course open upwardly so as to receive any material falling from the top run of the conveyer, or to receive snow or rain or any other foreign matter from any source. For enabling such foreign matter to escape readily from the pockets, the side bars 18 and 19 are provided with openings 33 and 34 therethrough, as shown in connection with the side bar 19 in Fig. 2.

Means is provided also for breaking up any masses of foreign material accumulated in such recesses. Such means comprise cutting elements 35 in the form of ribs positioned between the side bars 18 and 19, with comparatively sharp ridges along their inner edges, each rib being in position to stand in slightly spaced relationship to the end of one of the sprocket teeth 15 as the linked unit of the conveyer moves about the sprocket. The arrangement is such that any extensive accumulation of foreign matter in any of the recesses is pressed forcibly between the rib 35 and the end of a tooth 15 so as to break up such mass of foreign material and press it along the side faces of the rib and out through the openings 33 and 34. It has been found in practice that the above described arrangement of the ribs 35 relative to the sprocket teeth provides an effective means for breaking up and removing masses of ice or other solid materials which accumulate in the recess 32 between the chain side bars 18—19.

While the form and arrangement of parts as shown and described are preferred, the invention is not to be limited thereto except so far as the claims may be so limited, it being understood that changes might well be made in the form and arrangement of the parts without departing from the spirit of the invention.

I claim:

1. An endless conveyer comprising in combination a series of links in the form of plates pivotally connected together in mutually overlapping relationship so as to form an effective seal completely about the conveyer, sprockets about which said connected link plates extend, and means carried by the plates adapted by movement toward the sprockets upon operation of the conveyer to apply pressure for breaking up masses of foreign matter accumulated on the inner faces of the plates and to move said material laterally under pressure away from said sprockets.

2. An endless conveyer comprising in combination a series of links in the form of plates pivotally connected together in mutually overlapping relationship so as to form an effective seal completely about the conveyer, sprockets about which said connected link plates extend, and cutting elements carried by said plates adapted by movement toward the teeth of the sprockets to apply pressure for breaking up masses of foreign matter accumulated on the inner faces of the plates.

3. An endless conveyer comprising in combination a series of links in the form of plates pivotally connected together in mutually overlapping relationship so as to form an effective seal completely about the conveyer, sprockets about which said connected link plates extend, and cutting elements in the form of ribs having ridges extending across the plates longitudinally of the conveyer opposite to the teeth of the sprockets adapted by movement toward the teeth to break up masses of foreign matter accumulated on the inner faces of the plates.

4. An endless conveyer comprising in combination a series of links in the form of plates pivotally connected together in mutually overlapping relationship so as to form an effective seal completely about the conveyer, sprockets about which said connected links extend, bearings on the inner faces of said plates for engagement with the teeth of one of the sprockets for driving the conveyer, link side bars positioned at opposite sides of said bearings and extending across said plate links serving to hold the conveyer in operative position transversely with respect to said sprockets and having openings therethrough for the escape of foreign matter accumulated between said link side bars, and means positioned intermediate the side bars and cooperating with a sprocket tooth to press the material laterally through the openings in the side bars.

5. An endless conveyer comprising in combination a series of links in the form of plates pivotally connected together in mutually overlapping relationship so as to form an effective seal completely about the conveyer, sprockets about which said connected links extend, bearings on the inner faces of said plates for engagement with the teeth of one of the sprockets for driving the conveyer, link side bars positioned at opposite sides of said bearings and extending across said plate links serving to hold the conveyer in operative position transversely with respect to said sprockets and having openings therethrough for the escape of foreign matter accumulated between said link side bars, and rib located intermediate the side bars and extending lengthwise thereof and cooperating with a sprocket tooth upon the operation of the conveyer to apply pressure for breaking up masses of foreign matter accumulated between said plates and to displace said material laterally through said openings.

6. An endless conveyer comprising in combination a series of links in the form of plates pivotally connected together in mutually overlapping relationship so as to form an effective seal completely about the conveyer, sprockets about which said connected links extend, bearings on the inner faces of said plates for engagement with the teeth of one of the sprockets for driving the conveyer, link side bars positioned at opposite sides of said bearings and extending across said plate links serving to hold the conveyer in operative position transversely with respect to said sprockets and having openings therethrough for the escape of foreign matter accumulated between said link side bars, and cutting elements on the inner faces of the plate links in the spaces between said link side bars adapted by movement toward the teeth of the sprockets to break up masses of foreign matter accumulated between said link side bars.

7. An endless conveyer comprising in combination a series of links in the form of plates pivotally connected together in mutually overlapping relationship so as to form an effective seal completely about the conveyer, sprockets about which said connected links extend, bearings on the inner faces of said plates for engagement with the teeth of one of the sprockets for driving the conveyer, link side bars positioned at opposite sides of said bearings and extending across said plate links serving to hold the conveyer in operative position transversely with respect to said sprockets and having openings therethrough for the escape of foreign matter accumulated between said link side bars, and cutting means in the form of ribs having ridges extending across the link plates longitudinally of the conveyer opposite to the teeth of the sprockets adapted by movement toward the teeth of the sprockets to break up masses of foreign matter accumulated in the recesses between said link side bars.

8. An endless conveyer comprising in combination a series of links in the form of plates pivotally connected together in mutually overlapping relationship, chain link elements each comprising two side bars in spaced relationship to each other at each end portion of each of the link plates connected by a bearing sleeve adapted to fit between cooperating bearing portions of the corresponding cross plates of the adjacent link plate, sprockets about which said connected link plates extend with the teeth of the sprockets extending between the chain link side bars of the several link plates successively and engaging said bearing sleeves in turn for driving the conveyer, said chain link side bars having openings therethrough for the ready escape of foreign matter accumulated between said link side bars, and cutting means on the link plates between the link side bars in position to cooperate with the teeth of the sprockets for breaking up masses of foreign matter accumulated between the link side bars and for forcing it out through said openings.

EDMUND C. ANDERSON.